June 27, 1944.  F. W. WOHLFIELD  2,352,421
FENDER AND FENDER SHIELD CONSTRUCTION
Filed Aug. 8, 1941   2 Sheets-Sheet 1
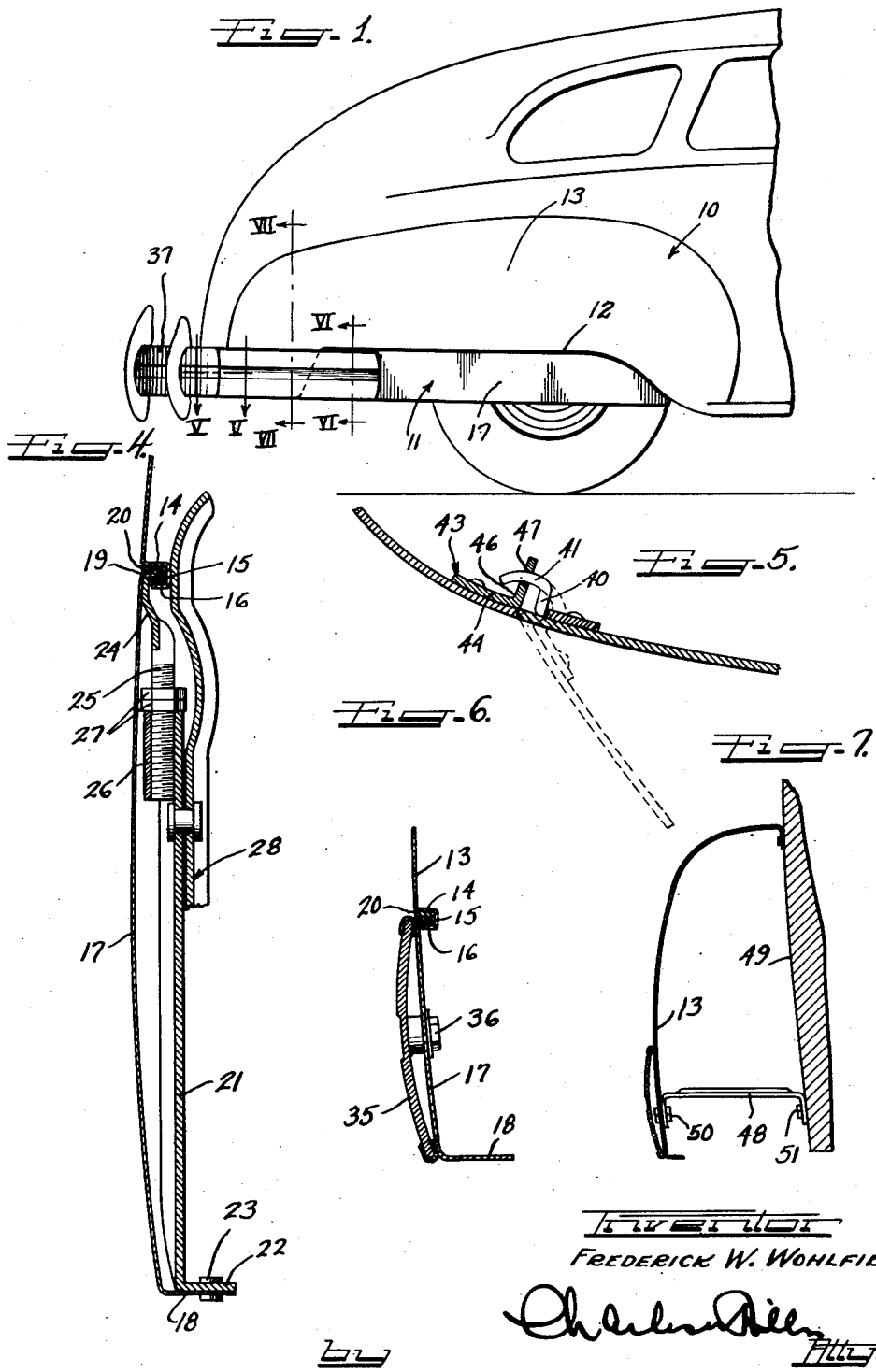
Inventor
FREDERICK W. WOHLFIELD.

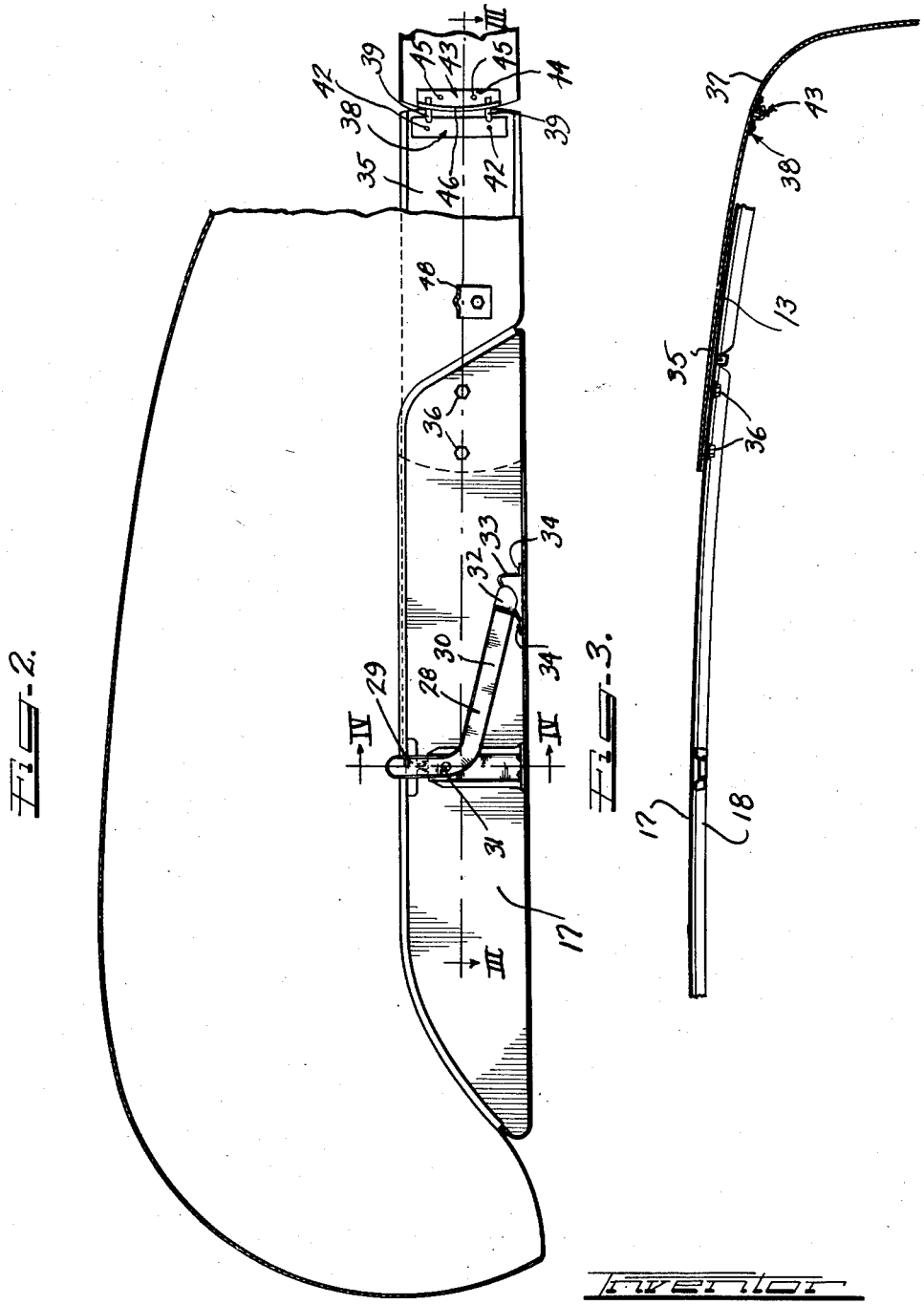

Patented June 27, 1944

2,352,421

UNITED STATES PATENT OFFICE 2,352,421

FENDER AND FENDER SHIELD CONSTRUCTION

Frederick W. Wohlfield, Detroit, Mich., assignor to Houdaille-Hershey Corporation, Detroit, Mich., a corporation of Michigan Application August 8, 1941, Serial No. 405,896

2 Claims. (Cl. 293—57)

This invention relates to a fender and fender shield construction, and more particularly to a fender having a combined side bumper and fender shield thereon.

In the vehicle industry, and particularly in the automobile industry, various means have been utilized to improve the appearance of vehicle fenders. The usual vehicle fender is provided with an opening which affords access to the vehicle, and which permits the ready removal of the wheel in an axial direction. Since this opening inherently presents an ugly outwardly appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender and fender shield construction and assembly of novel design, and particularly a fender and fender shield having in combination therewith a side bumper portion or element.

It is a further object of this invention to provide a fender and fender shield assembly which is economical to manufacture and which is rugged and reliable in use.

Another object of the present invention is to provide a novel fender, fender shield and side bumper construction and assembly.

A further object of the present invention is to provide a combination fender shield and bumper construction which is detachably and pivotally supported on the vehicle.

A still further object of the present invention is to provide a novel bumper construction and means for mounting the same.

Another and further object of this invention is to provide a novel fender shield and means for mounting the same.

The novel features which I believe to be characteristic of my invention are set forth with particularity in the appended claims. My invention itself, however, both as to its organization and manner of construction, together with further objects and advantages thereof, may best be understood by reference to the accompanying drawings, in which:

Figure 1 is an elevational view of the rear portion of an automobile having a fender, fender shield and side bumper construction thereon embodying the features of the present invention;

Figure 2 is an enlarged rear elevational view of the fender, fender shield and side bumper construction with a portion of the fender broken away to show the manner in which the fender shield and side bumper are pivotally supported on the rear bumper member;

Figure 3 is a horizontal sectional view through the assembly as taken along the line III—III of Figure 2;

Figure 4 is a vertical sectional view of the fender shield assembly as taken along the line IV—IV of Figure 2;

Figure 5 is an enlarged horizontal sectional view showing the detachable hinge connection between the side bumper and the rear bumper as taken along the line V—V of Figure 1;

Figure 6 is a vertical sectional view of the fender, fender shield and side bumper assembly as taken along the line VI—VI of Figure 1; and, Figure 7 is a vertical sectional view of the fender, fender shield and side bumper assembly as taken along the line VII—VII of Figure 1.

Referring now to the various figures of the drawings which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crowned type. The fender shield 11 is detachably mounted on the fender 10 and is positioned to cover the relatively large opening 12 in the outer side wall 13 of the fender 10 which is conventionally provided in substantially all vehicle fenders to permit access to and removal of the vehicle wheel therethrough.

The edge of the fender 10 surrounding the opening 12 is provided with a marginal portion which is bent inwardly as at 14 (Figure 4), then downwardly as at 15 and finally forwardly as at 16 to provide an outwardly opening channel formation. This formation on the edge of the fender 10 not only stiffens the fender but also provides a supporting medium for the fender shield 11 as will hereinafter be more fully explained.

The fender shield 11 comprises a sheet metal panel 17 which is large enough to cover the entire wheel access opening 12 as well as to be seated within the channel formation formed by the marginal portions 14, 15 and 16 of the fender 10. The lower edge of the panel 17 is bent inwardly as at 18 to form a base flange therefor. The top and opposite sides of the panel 17 are bent back in a flange portion 19 upon which is mounted a rubber edging or cushioning strip 20 which may be secured or bonded thereto in any suitable manner well known to those skilled in the art.

This rubber molding or edging 20 is of such a size as to snugly fit within the channel of the fender 10 formed by the flange portions 14, 15 and 16.

The fender shield 11 is reinforced by a strut 21 which extends upwardly behind the panel portion 17 from the lower base flange 18 to a point in proximity to the upper flange 19. The strut 21 has a base portion 22 which is seated on the base flange 18 and is secured thereto in any suitable manner, such as by rivets 23. In order that this strut member 21 may possess sufficient rigidity without employing an undue amount of metal therein, it is preferably channel shaped in cross section.

Mounted on the top of the strut 21 is a vertically adjustable member 24 which extends up against the top flange 19 and also lies against the inner face of the panel portion 17 in proximity to the top flange 19. This adjustable plate 24 is carried on a threaded stud 25 which extends down into a recess formed by the upper portion of the strut 21 and a strap bracket 26 which is secured to the strut 21. A pair of nuts 27 are fitted onto the threaded shank of the stud 25 and are tightened down against the top of the strut 21 to force the plate 24 upwardly into tight engagement with the flange 19.

Mounted on the strut 21 is a latching arm 28 which includes a short leg portion 29 and a relatively long leg portion 30, disposed at an angle with respect to the short leg portion 29. This latching arm 28 may be conveniently mounted on the strut 21 by a mounting stud or rivet 31 as carried on the strut 21. The short leg portion 29 of the latching arm 28 is shaped to engage the flange 15 of the fender 10 as is clearly shown in Figure 4. The long leg portion 30 of the latching arm 28 extends downwardly to the bottom of the assembly and its lower end 32 is offset with respect to the remaining portion of the latching arm 28 so as to enable it to be seated on a strut bracket 33 which is secured to the brace edge 18 of the fender in any suitable manner, such as by rivets 34.

Formed as an integral part of the fender shield construction 11 is an auxiliary bumper member 35 which is secured to the panel portion 17 in any suitable manner, such as by rivets 36. As is clearly shown in Figures 1 and 2, the auxiliary bumper member 35 forms a continuous and harmonious part of the panel portion 17 and extends rearwardly in overlapping relationship with the fender 10 to a point in close proximity to the end of the rear bumper member 37. An attaching plate 38 is provided at the rear extremity of the bumper member 35, which plate includes a pair of hooked fingers 39 which extend first inwardly from the auxiliary bumper member 35 as at 40 (Figure 5) and then rearwardly in arcuate end portions 41. The attaching plate member 38 is secured to the auxiliary bumper member 35 in any suitable manner such as by rivets 42.

A complementary attaching plate member 43 is provided on the rear bumper member 47 and includes a base portion 44 which is riveted, or otherwise suitably secured, as at 45, to the rear bumper member 47. This attaching plate 43 is in the form of an angle plate having a free side wall portion 46 which is provided with suitable slots or openings 47 (Figure 5) through which the end portions 41 of the attaching plate 38 may extend. The cooperating attaching plates 38 and 43 in conjunction with the channel portions 14, 15, 16 of the fender 10 into which the inwardly bent flange 19 extends provides a vertical support for the fender shield and bumper unit. The cooperating attaching plates 38 and 43 in conjunction with the latching lever 28 provide means for restraining outward displacement of the fender shield and bumper unit away from the fender and hold it snugly in place thereon.

To reinforce the entire assembly against impacts received on the auxiliary bumper member 35, a stiffening member or strut 48, which extends between the outer depending side wall 13 of the fender 10, and the principal body portion 49, of the vehicle, immediately to the rear of the opening 12. The strut member 48 is bolted or otherwise suitably secured to the fender 10 and to the body 49 of the vehicle, as at 50 and 51, respectively (Figure 7).

In order to mount the combination fender shield and auxiliary bumper unit on the fender, the latching lever 28 is rocked to a position where the long leg portion 30 extends substantially downwardly which necessarily causes the short leg portion 29 to be moved to a position below the top edge of the panel 17. The unit is then held in an angular position as indicated by the dotted lines in Figure 5 and the arcuate end portions 31 of the attaching plate 38 are hooked through the openings 47 in the complementary plate member 43. The unit is then rocked about the fingers 41 so as to bring the entire panel portion of the fender shield into position against the fender. During this latter operation, the inwardly turned flange 19 with the rubber cushioning strip 20 is moved into the channel 14, 15, 16 of the fender 10. With the fender shield unit held in this position, the latching lever 28 is rocked in such a manner as to move the short leg portion 29 into engagement with the undersurface of the flange portion 15 of the fender 10 and the lower end 32 of the latching lever 28 is sprung over the bracket 33. The fender shield and bumper unit is now in firm mounted engagement on the fender.

To remove the fender shield unit from the fender, the above described operation is carried out in reverse order.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. In a vehicle having an outer depending side wall portion overhanging a wheel thereon and having an opening in said wall opposite the wheel, and a rear bumper member, the combination comprising a fender shield and auxiliary side bumper unit comprising a panel portion arranged to cover the wheel opening in said wall, a bumper member rigidly secured to said panel portion, and means for detachably securing said panel and said auxiliary bumper member to said vehicle including detachable means for pivotally supporting said auxiliary bumper member on said first bumper member, and means for supporting and clamping said panel to said side wall.

2. In a vehicle having an outer depending side wall portion overhanging a wheel thereon and having an opening in said wall opposite the wheel, and a rear bumper member, the combination comprising a fender shield and auxiliary side bumper unit comprising a panel portion arranged to cover the wheel opening in said wall, a bumper member rigidly secured to said panel portion, and means for detachably securing said panel and said auxiliary bumper member to said vehicle including detachable means for pivotally supporting said auxiliary bumper member on said first bumper member, and means for supporting and clamping said panel to said side wall, said auxiliary bumper member overlying and seated on said side wall adjacent said opening.

FREDERICK W. WOHLFIELD.